March 12, 1929.  E. F. MILLER  1,704,759
OPERATING VALVE
Filed July 28, 1925  3 Sheets-Sheet 3
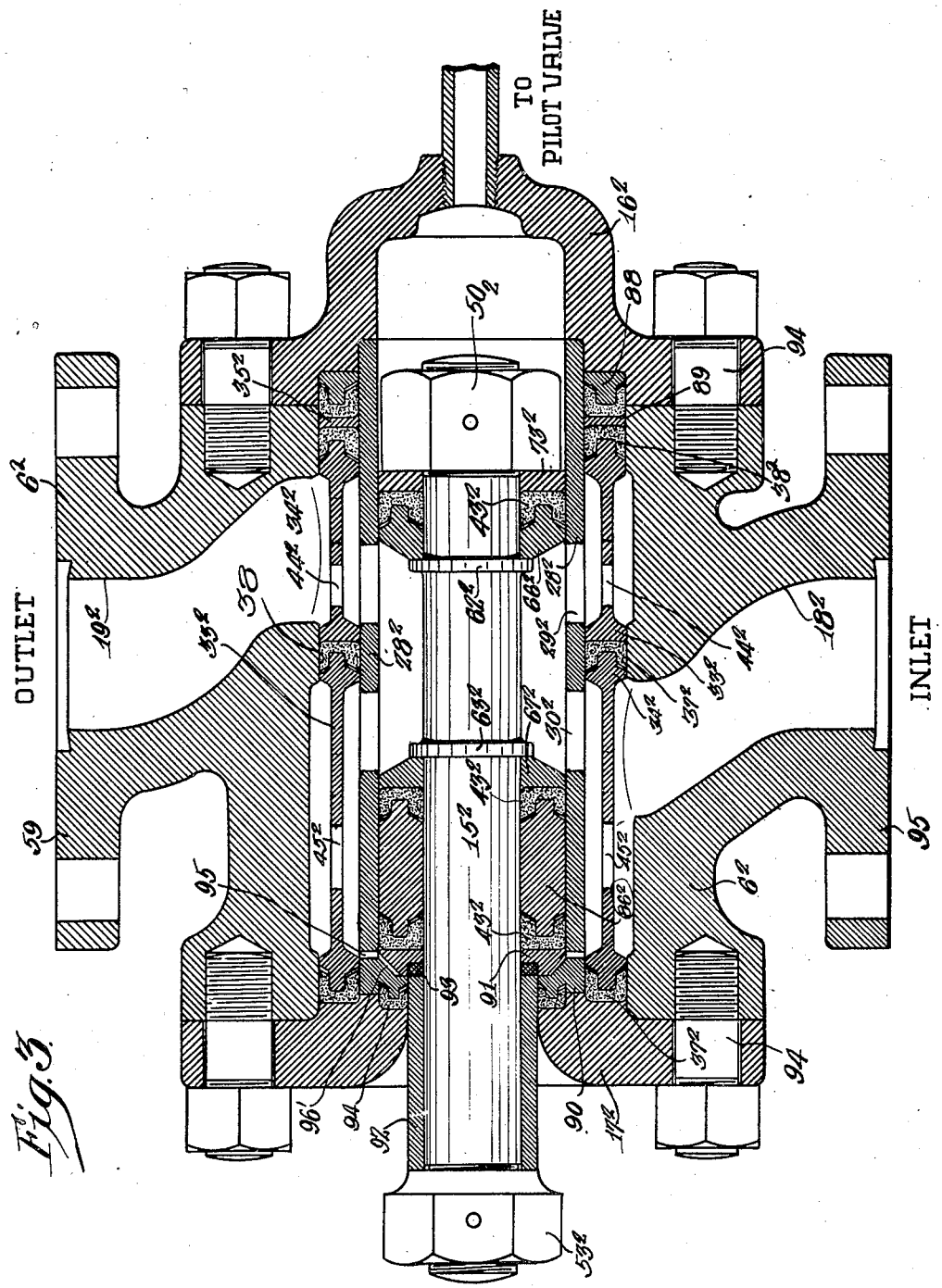
Fig. 3.
INVENTOR.
Edwin F. Miller
BY
ATTORNEY.

Patented Mar. 12, 1929.

1,704,759

UNITED STATES PATENT OFFICE.

EDWIN F. MILLER, OF MERCHANTVILLE, NEW JERSEY.

OPERATING VALVE.

Application filed July 28, 1925. Serial No. 46,581.

My invention relates to operating valves for control of the movements of fluid-operated and hand-operated valves, including pilot valves and check valves.

The main purpose of my invention is to maintain and improve the sealing qualities and greatly reduce friction by the use of drawn copper seamless tubing for the lining of the valve.

A further purpose is to seal against the outside of the lining by body separators of uniform exterior and interior diameters.

A further purpose is to simplify and cheapen the replacement of worn lining members in operating valves.

A further purpose is to seal a uniform lining for the valve exteriorly by packings as distinguished from a metal-to-metal fit, greatly reducing the friction against its movement, facilitating its insertion and removal and preferably further increasing its accessibility by making it removable from either end.

A further purpose is to provide a uniform bore lining with a uniform exterior, spaced from a uniform body bore and to seal between the lining and the bore of the body and against it by annular packing members encasing the tubing.

A further purpose is to standardize valve constructions by the use of spacers outside of the lining which can be made of standard form and separators inside the lining also capable of standardization.

A further purpose is to provide for packing and spacing members between the lining and bore of the body of the valve, which members are uniform except as to the lengths of the members and which, subject to this dimension, are interchangeable in the same valve and in different valves of the same diameter.

A further purpose is to provide a pilot-operated valve with leak-port closure effective when the pilot pressure is greatly reduced.

A further purpose is to provide constant closing pressure upon the end of a pilot-operated valve to close it when the pilot valve pressure drops.

Further purposes will appear in the specification and in the claims.

I have preferred to illustrate my invention by one general form only, applied to several different valve uses, selecting a form which has proved to be practical, efficient, reliable and inexpensive and which at the same time well illustrates the principles of my invention.

Figure 1:
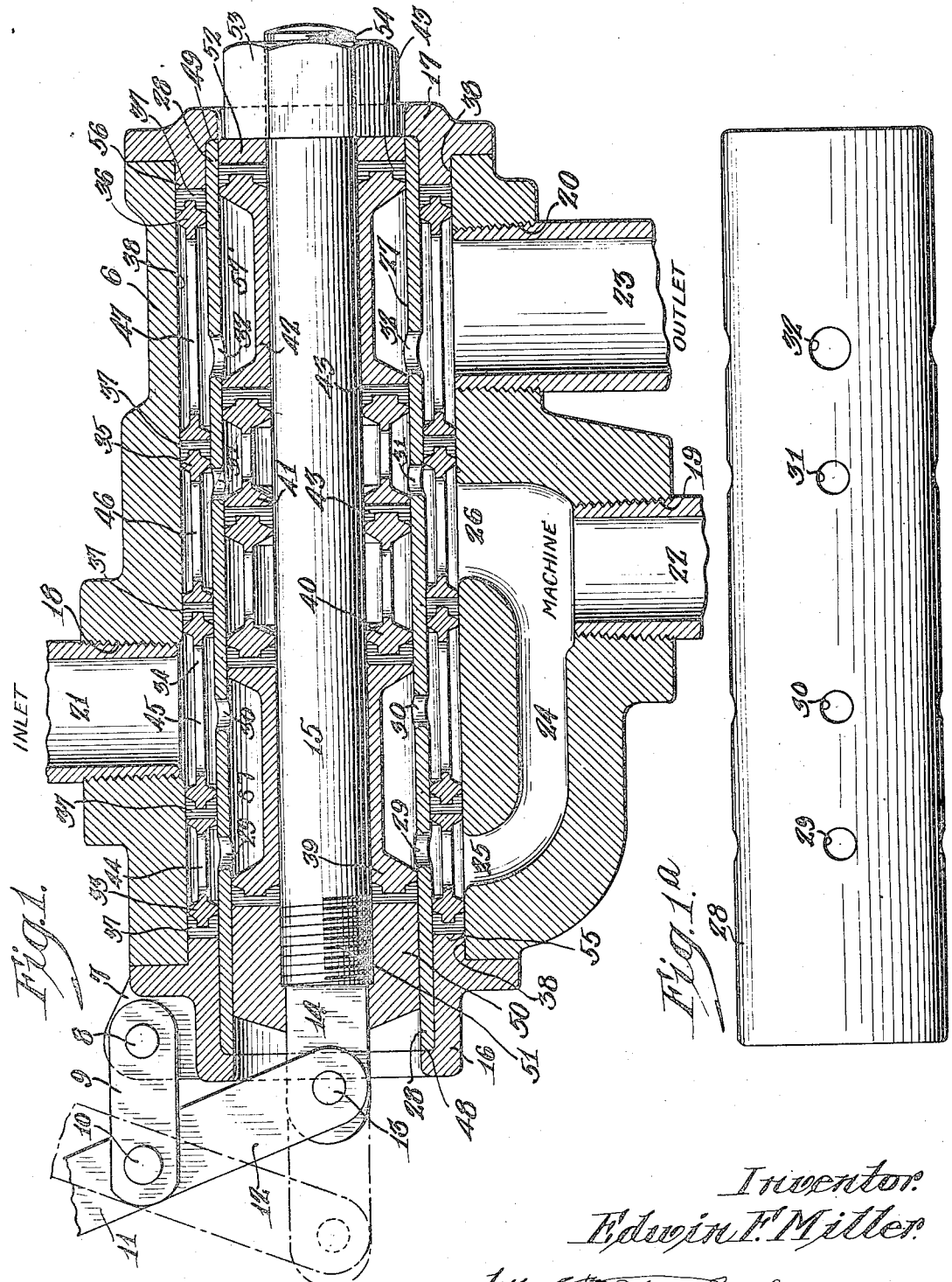
Figure 2:
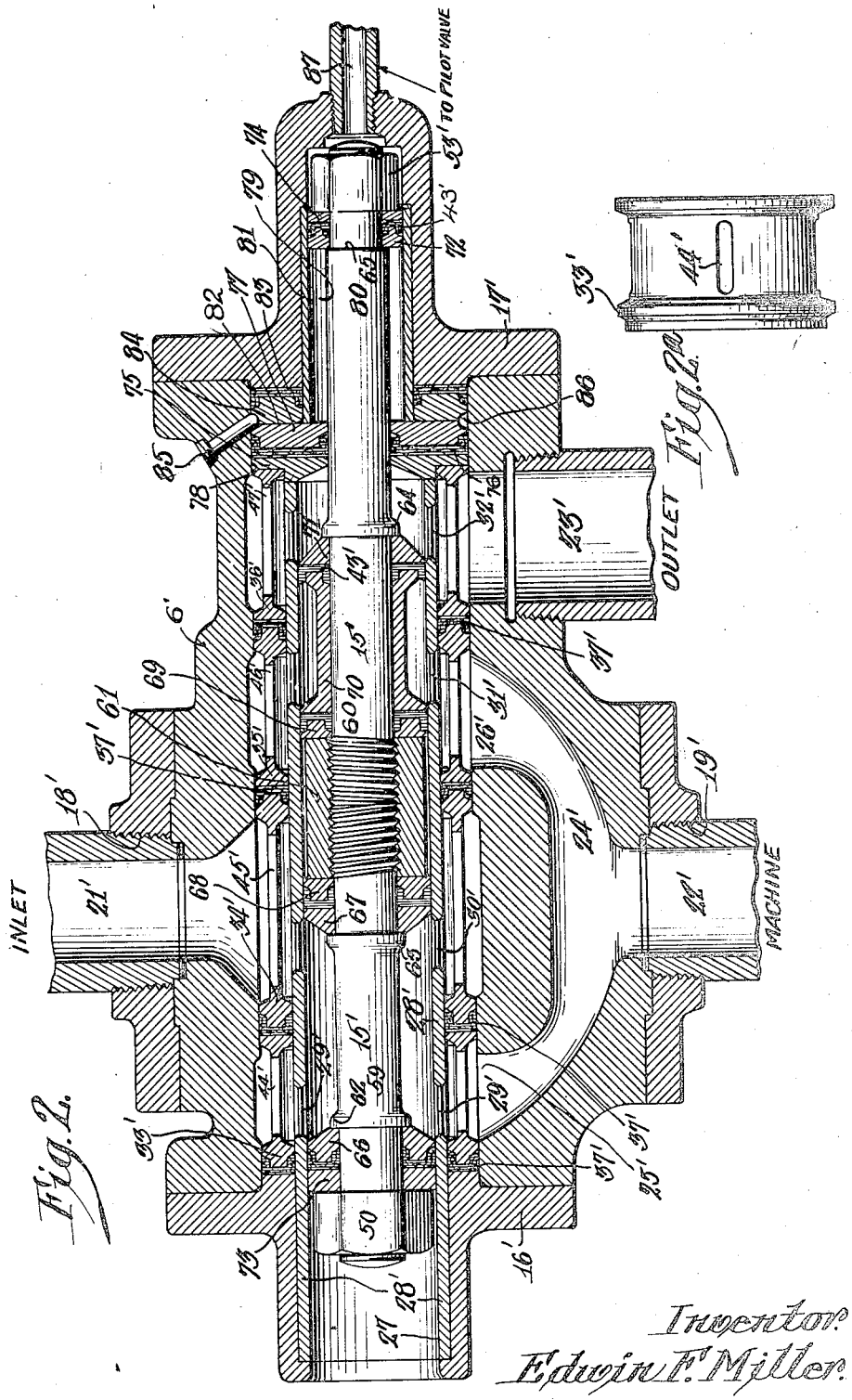

Figures 1, 2 and 3 are longitudinal central sections of a hand-thrown operating valve, a hydraulically-operated operating valve and a pilot-operated stop valve arranged for automatic closure, respectively, embodying my invention.

Figures 1$^a$ and 2$^a$ are elevations of parts of Figures 1 and 2.

Describing in illustration and not in limitation and taking up first the valve shown in Figure 1:—

The body 6 is provided with one or more of the usual attachment lugs 7 by which, through pin 8, link 9 and pin 10, an operating lever 11 may be connected so that the pin 10 will afford a fulcrum about which the lever will swing, it being evident that the fulcrum may be at either of the well known positions in the lever, the intermediate fulcrum being selective for illustration. The lever is extended therefore at 12 beyond the fulcrum to engage a pin 13 passing through the end 14 of plunger rod 15.

The body of the valve is uniformly interiorly bored so as to permit the use of spacing and packing members of uniform diameter and also to provide for their insertion and withdrawal into or from either end. The bore receives terminal rings 16 and 17 at opposite ends.

Within the body are provided threaded openings at 18, 19 and 20 for inlet, machine connection and exhaust pipes 21, 22 and 23. The machine connection 19 opens into a passage 24 which joins the bore at two spaced points 25 and 26.

For the effective bore of the valve I take the interior diameter 27 of a seamless tube 28 which is provided with a number of sets of annularly arranged holes shown at 29, 30, 31 and 32, differing in the number of sets and their location according to the character of the valve. This character determines the number of annular spacing and packing members 33, 34, 35 and 36 which, along with their packings 37, are located between the seamless tube and the bore 38 of the body of the valve, and also the number and relative placing of the plunger packing and separator members 39, 40, 41 and 42 mounted upon the plungers. These last are used to hold annular packings 43. To give more free liquid flow, separators 40 and 41 are apertured at their central sections which are of reduced cross section, radially spaced from the rod 15.

Seamless drawn copper is selected for the tube not only because it has no transverse machining or "finishing" to spoil the longitudinal "grain" finish given it by the drawing operation but also because, from the nature of the drawn metal, as distinguished from cast metal, there is no such pitting in the surface as is inevitable in tool-finished or ground castings. The drawn finish and dead copper surface greatly reduce the friction and avoid the cutting of the plating which takes place where the surface is pitted.

The body spacing members 33—36 are apertured at points about their circumferences at 44, 45, 46 and 47 and are held tight against their packings respectively by the end caps 16 and 17 which at the same time engage the seamless tube lining at 48 and 49 to retain it against end movement. All of the packings 37 are thus held properly clamped between or upon the spacing members so as to seal against the interior of the body of the valve on the outside and the seamless tube on the inside.

As will be evident from the illustration considerable variation of the positions of the packings 37 and the apertures in the spacing members is permissible provided they permit access between openings 29 and passage 25, openings 30 and the inlet pipe 21, openings 31 and passage 26 and openings 32 and the exhaust passage 23, respectively, or provide for other desired paths of travel, according to the character and particular design of the valve and at the same time confine the flow of these paths.

Facility of annular flow is provided about the circumference of the seamless tube opposite each set of openings 29—32 by reducing the thicknesses of the spacing and packing members to establish annular passages preferably both inside and outside the openings 44—47.

The spacings between the packings 43 upon the plunger are determined by the selections of the lengths of the spacing members 39, 40, 41 and 42. These are held in position so as to clamp the packings between and against them by a nut 50 upon the thread 51 at one end of the plunger rod 15 and an abutment such as a washer 52 held in place by nut 53 upon thread 54 at the other end of said rod.

It is to be noted that the end caps 16 and 17 project annularly at 55 and 56 to engage the packings.

As will be apparent, a few standard lengths of spacers between the tubing and the interior of the valve body will take care of the needs of the valves of a given size as will also a few standard lengths of separating packing holders between the rod and the tubing, since each of these sets of spacers and separators may have a uniform diameter for a given size of valve.

My invention is not restricted to use with or in the specific valve shown, whose arrangements of inlet, exhaust and machine connection as such are in themselves old, but in order that the illustration may be clearly understood I will trace out the water connections of the illustration, Figure 1.

With the plunger in the position shown, inlet water passes through the apertures 45 and openings 30 inwardly to space 57, thence axially out through the openings 29, within the tubing and about it, through apertures 44 and passage 25 to the machine, the flow of water to the right of the figure from the inlet being prevented by the positions of the packings.

With the lever in the dotted position in Figure 1 and the plunger at the left of that figure, (to close the valve) the inlet water from pipe 21 is trapped by the packings at the two ends of separator 40, which then lie on opposite sides of the openings 30 and one of which cuts off from the inlet the openings 29. The openings 31 and 32, however, are connected through the space 57' between the ends of separator 42, which separator now bridges both openings, so that the machine can exhaust through the connection 26, opening 31, space 57' and opening 32 to the outlet.

In the form shown in Figure 2, the structure closely parallels the structure of Figure 1 in the general location of the inlet 21', the machine connection 24', branched through 25', 26', the outlet 23' and the general location and placing of the spacing and packing members 33', 34', 35', 36' with their openings 44', 45', 46' and 47'. Packing 37' is used between and at the ends of the spacers. The body 6' is closed by a cap 16' which retains the lining 28'.

The plunger 15' is split for convenience of assemblage into two parts 59 and 60 which are reversely threaded so as to be held together by coupling 61. This division of the plunger shaft permits the use of flanges 62, 63 and 64 and shoulder 65 to hold the rings 66, 67, 68, 69, 70, 71 and 72 upon the plunger against the flanges and shoulder or against the coupling, so that these rings together with the rings 73 and 74 upon the plunger and nuts 50 and 53' hold packings 43' in position to bear against the interior of the lining. It will be noted that in all the figures the cup leathers are held so that the water does not crown them into the openings.

Here, as in Figures 1 and 3 the lining is of seamless drawn copper tubing. It is apertured at 29', 30', 31', 32', so as to secure the same general construction and mode of operation as in the case of Figure 1, notwithstanding that the coupling requires different distribution of the parts to accomplish the result.

At the end of the lining I provide an abutting ring 75 with which the tube and the spacing and packing ring 36' engage on the inside but need not seal, but which seals through packing 76 and ring 77 with the interior 78 of this end of the body 6'. This packing protects against flow of fluid outwardly at the end so as to form a compartment 79 between the extension 80 of the plunger and a lining sleeve 81 within the cap 17'.

This lining sleeve is also preferably of seamless drawn copper tubing and is sealed from the joint 82 between the body and the cap 17' by packing 83 and ring 84. The rings 77 and 84 permit flow of fluid into this space or cylinder 79 from a constant inlet pressure supply of fluid, viewed throughout for convenience as water, at 85. The inlet fluid is allowed to course about the outside of these two rings 77 and 84 through a groove 86 so as to facilitate inward flow of this constant pressure supply. The faces of these rings may be grooved to provide for water flow, or not as desired. The pressure must be sufficient to throw the valve plunger to the right when the pilot valve pressure is withdrawn. This connection may be taken from an accumulator or other source and need bear no exact relation in pressure to that of the pilot valve applied to pipe 87.

The constant pressure supply within cylinder 79 acts upon the inner face of ring 72 whereas the pressure from the pilot is effective upon the exterior end of the plunger, including ring 74. For this reason the pilot pressure would be effective to throw the valve plunger to the left against the same pressure operating upon the annulus of the ring 72 only.

In operation, the valve connects for machine operation and machine exhaust in the same manner as the valve of Figure 1 with the difference, however, that the present valve is fluid-operated with automatic fluid retraction of its floating stem or plunger when the pilot valve pressure is released, whereas the valve of Figure 1 is hand operated.

In both of the valves, as in that of Figure 3, it is desirable to slightly round the edges of the openings 29, 30, 31, 32, 29', 30', 31', 32', 29$^2$, 30$^2$ in order to avoid undue abrasion of the packing against these edges and to facilitate liquid flow.

In Figure 3 a pilot-operated automatic valve is shown having inlet and outlet but no machine connection.

Paralleling the structure of the other figures this form shows inlet 18$^2$ and outlet 19$^2$, corresponding to the machine connection, to a body portion 6$^2$ bored at 38' to receive spacing and packing annuli 33$^2$, 34$^2$ cooperating with ends 16$^2$, 17$^2$ and rings 88, 89 to hold packing 37$^2$. The tube 28$^2$ is held in place by the ends 16$^2$ and 17$^2$ and a ring 90.

The rings are apertured at 44$^2$, 45$^2$ and the tube is apertured at 29$^2$ and 30$^2$.

The plunger 15$^2$ is flanged at 62$^2$, 63$^2$ for rings 66$^2$, 67$^2$, which cooperate with rings 73$^2$, 86$^2$ to hold packings 43$^2$ sealing against the interior of the tube. At the one end the rings and packings are held in place by a nut 50$^2$; and at the other end the packing 43$^2$, ring 67$^2$ and an additional packing 43$^2$ are held by ring 91. Sleeve 92 is separated from the ring by packing 93 and is held by nut 53$^2$.

A packing 94 is held in place between the head 17$^2$ and ring 90.

As the normal position of this valve when the pilot pressure is off is intended to be with the plunger close to the pilot valve inlet, a leak port 95 is provided connecting with groove or grooves 96' and in constant communication with the inlet opening, so that the pressure supplied by this leak port can get back of the annulus upon the plunger formed by that portion of the ring 91 outside of sleeve 92 to force the plunger back when the pilot valve pressure is off.

The stud fastenings for the heads, omitted in the other figures are shown at 94 for inlet and outlet connection here shown as integral with the body.

Though I much prefer to apply my invention to valves in which the plunger moves, because there is friction on but one side of the lining in them, it will be obvious that my invention will apply and with even greater benefit, to valves in which the lining is moved and in which for this reason, there is friction upon both the inside and the outside of the lining.

In operation the same sequence of connections between the inlet and outlet or cutting off this connection takes place in the open position shown in the figure and in its closed position as in Figure 1 between the inlet and machine connection when the valve of Figure 1 is open or closed, with the difference however, that there is no exhaust for the outlet when the valve is closed corresponding to the exhaust connection of Figure 1.

The valve is thrown to open position by pilot pressure and is automatically returned by the leak port inlet pressure when the pilot pressure is cut off.

In the showing of the valves selected it is not my intention to suggest that the invention is in any way limited to the character of valves shown. I know that it is applicable alike to valves having any number of openings, such as two-way, three-way or four-way, whether balanced or otherwise and without regard to whether additional pressure or exhaust may be provided or not. The selection of these different forms of valve is a matter of design accommodating to the intended use.

I recognize that in view of my disclosure herein various uses of my invention will be suggested to those skilled in the art to secure all or a part of the benefit from it. It is my purpose therefore, to include herein all such as come within the reasonable spirit and scope of my claims.

Having thus described my invention what

I claim as new and desire to secure by Letters Patent is:—

1. A valve body, in combination with a lining therefor, comprising seamless drawn tubing apertured to provide ports therein and a plunger fitting the interior of said tubing.

2. A valve body, in combination with a lining therefor, comprising seamless drawn copper tubing apertured to provide ports therein and a plunger fitting the interior of said tubing.

3. A valve body, a seamless drawn tube lining therein having apertures to provide ports in the tubing and the edges of the apertures being relieved, in combination with a plunger for the valve engaging the interior of the tubing to seal against it.

4. A valve body having uniform bore, in combination with a tubular lining apertured to provide ports therefor, of uniform interior and exterior diameter throughout its operating length, spacing and packing rings, the packing on the inside tightly engaging the tubing and on the outside engaging the interior of the body bore, and a plunger operating upon the interior of the tubing.

5. A valve body of uniform interior diameter throughout its operating length, a plurality of spacers therein of uniform exterior and interior diameter respectively, packing between the spacers and at the ends of the spacers, means for closing the end of the body sealing against the packing for the spacers, seamless drawn apertured tubing within the spacers sealing against the packing for the spacers and a plunger having packing therein operating in the tubing and engaging the interior of the tubing.

6. A valve body of uniform interior diameter throughout its operating length, a plurality of spacers therein of uniform exterior and interior diameters respectively, packing between the spacers and at the ends of the spacers, means for closing the end of the body sealing against the packing for the spacers, seamless drawn tubing within the spacers sealing against the packing for the spacers and ported for liquid passage, a plunger stem within the tubing and separators and packing, therefor, mounted upon the stem and engaging the uniform interior diameter of the tubing.

7. A valve body, a plunger stem therein, seamless drawn tubing, ported for liquid passage, forming a lining spaced from the body and from the stem, and leaving annular spaces of uniform interior and exterior diameters between the lining and the body on the one side and the lining and the stem on the other and liners and spacers with packing, therefor, filling these annular spaces and end clamping members for tightening the liners and spacers against their packing and against the body, shell and stem adjoining.

8. A longitudinally bored valve body, a tubular lining within the body, apertured at intervals and providing the operating chamber for a valve plunger, removable spacers between the body and the lining setting off the space between the bore of the body and the lining into annular pockets communicating through the apertures with the interior of the lining, the spacers supporting the lining from the body and a plunger within the lining.

9. A uniformly bored valve body, a lining of uniform exterior and interior diameter throughout the operating range therein, apertured at intervals, annular spacers and packing supporting the lining from the body and forming annular spaces corresponding with the aperture of the lining, a plunger within the lining and separators and packing mounted upon the plunger affording different grouping of the apertures in the lining in different positions of the plunger.

EDWIN F. MILLER.